(12) United States Patent
Kuriyama et al.

(10) Patent No.: US 12,413,274 B2
(45) Date of Patent: Sep. 9, 2025

(54) WIRELESS COMMUNICATION SYSTEM, WIRELESS COMMUNICATION METHOD, AND TRANSMITTER

(71) Applicant: NIPPON TELEGRAPH AND TELEPHONE CORPORATION, Tokyo (JP)

(72) Inventors: Keita Kuriyama, Musashino (JP); Hayato Fukuzono, Musashino (JP); Toshifumi Miyagi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/291,261

(22) PCT Filed: Aug. 10, 2021

(86) PCT No.: PCT/JP2021/029518
§ 371 (c)(1),
(2) Date: Jan. 23, 2024

(87) PCT Pub. No.: WO2023/017564
PCT Pub. Date: Feb. 16, 2023

(65) Prior Publication Data
US 2024/0333347 A1 Oct. 3, 2024

(51) Int. Cl.
*H04B 7/02* (2018.01)
*H04B 7/0417* (2017.01)
*H04B 7/0456* (2017.01)

(52) U.S. Cl.
CPC ......... *H04B 7/0456* (2013.01); *H04B 7/0417* (2013.01)

(58) Field of Classification Search
USPC ............... 375/267, 260, 259, 219, 295, 316
See application file for complete search history.

(56) References Cited

U.S. PATENT DOCUMENTS

| | | | |
|---|---|---|---|
| 2011/0228758 A1* | 9/2011 | Hammarwall | ...... H04L 27/2614 370/344 |
| 2019/0052235 A1* | 2/2019 | Seo | ...................... H04B 1/0475 |
| 2021/0167825 A1 | 6/2021 | Ramireddy et al. | |

OTHER PUBLICATIONS

Ibnkahla et al., "High-Speed Satellite Mobile Communications: Technologies and Challenges", Proceedings of the IEEE, vol. 92, No. 2, Feb. 2004, pp. 312-339.

(Continued)

*Primary Examiner* — Zewdu A Kassa
(74) *Attorney, Agent, or Firm* — XSENSUS LLP

(57) ABSTRACT

A radio communication system that performs MIMO transmission. The radio communication system includes a precoding unit that precodes multi-streams of transmission signals in a time domain; a plurality of transmission power control units that controls transmission power of each multi-stream precoded by the precoding unit. Further, there is a plurality of amplification units that amplifies each multi-stream precoded by the precoding unit in accordance with control of the plurality of transmission power control units; and a number-of-taps control unit that performs control to change the number of taps of the precoding unit to improve communication quality of the multi-streams on the basis of quality information of a received signal fed back from a reception device that has received the multi-stream amplified by each of the plurality of amplification units.

8 Claims, 9 Drawing Sheets

(56) References Cited

OTHER PUBLICATIONS

Kuriyama et al., "Wideband single-carrier MIMO system with FIR type transmit beam formation and bidirectional reception equalization", IEICE General Conference, B-5-105, Mar. 2019, pp. 371 (2 pages including English Translation).

* cited by examiner

Fig. 5

|  | SNR | INTER-STREAM INTERFERENCE |
|---|---|---|
| WHEN NUMBER OF TAPS IS LARGE | IT DETERIORATES DUE TO EFFECT OF SUPPRESSING TRANSMISSION POWER THAT INCREASES PAPR | IT IS SUPPRESSED BECAUSE NUMBER OF TAPS IS SUFFICIENT |
| WHEN NUMBER OF TAPS IS SMALL | IT IS IMPROVED BY EFFECT OF INCREASING TRANSMISSION POWER THAT REDUCES PAPR | IT INCREASES BECAUSE NUMBER OF TAPS IS INSUFFICIENT |

WIRELESS COMMUNICATION SYSTEM, WIRELESS COMMUNICATION METHOD, AND TRANSMITTER

CROSS-REFERENCE TO RELATED APPLICATION

The present application is based on PCT filing PCT/JP2021/029518, filed Aug. 10, 2021, the entire contents of which are incorporated herein by reference.

TECHNICAL FIELD

The present invention relates to a radio communication system, a radio communication method, and a transmission device.

BACKGROUND ART

In a single carrier-multi-level modulation radio communication system, it is expected that a signal to noise power ratio (SNR) will be increased by increasing transmission power to an allowable value. On the other hand, an amplifier that amplifies a transmission signal generally has nonlinear amplification characteristics, and signal distortion occurs when excessive transmission power is input.

For example, in a transmission device, when an input to an amplifier that amplifies a transmission signal increases, distortion occurs in the transmission constellation. Therefore, communication is generally performed by lowering a transmission output to such an extent that distortion does not occur (for example, see NPL 1).

Also, NPL 2 discloses a multiple input multiple output (MIMO) system that performs precoding in a time domain to control transmission power.

CITATION LIST

Non Patent Literature

[NPL 1] MOHAMED IBNKAHLA, et al., "High-Speed Satellite Mobile Communications: Technologies and Challenges," PROCEEDINGS OF THE IEEE, VOL. 92, No. 2, FEBRUARY 2004, p. 312-339

[NPL 2] Keita Kuriyama, Hayato Fukuzono, Masafumi Yoshioka, Tsutomu Tatsuta, "Wide-band Single-Carrier MIMO System Using FIR-type Transmit Beamforming and Bi-Directional Receive Equalization," IEICE General Conference, B-5-105, March 2019, p. 371

SUMMARY OF INVENTION

Technical Problem

In the conventional MIMO system performing precoding, a peak to average power ratio (PAPR) increases due to precoding. At this time, if the transmission power is suppressed and the peak transmission power becomes equal to or less than the allowable value, there is a problem that the SNR deteriorates.

The present invention has been made in view of the above-described problem, and an object of the present invention is to provide a radio communication system, a radio communication method, and a transmission device capable of improving an SNR while suppressing inter-stream interference in MIMO transmission.

Solution to Problem

According to one aspect of the present invention, there is provided a radio communication system that performs MIMO transmission, the radio communication system including: a precoding unit configured to precode multi-streams of transmission signals in a time domain; a plurality of transmission power control units configured to control transmission power of each multi-stream precoded by the precoding unit; a plurality of amplification units configured to amplify each multi-stream precoded by the precoding unit in accordance with control of the plurality of transmission power control units; and a number-of-taps control unit configured to perform control to change the number of taps of the precoding unit to improve communication quality of the multi-streams on the basis of quality information of a received signal fed back from a reception device that has received the multi-stream amplified by each of the plurality of amplification units or quality information of a received signal calculated using at least characteristics of the plurality of amplification units.

Further, according to one aspect of the present invention, there is provided a radio communication method for performing MIMO transmission, the radio communication method including: a precoding step of precoding multi-streams of transmission signals in a time domain; a transmission power control step of controlling transmission power of each precoded multi-stream; and an amplification step of amplifying each precoded multi-stream by a plurality of amplification units to achieve controlled transmission power, in which the radio communication method further includes a number-of-taps control step of performing control to change the number of precoding taps to improve communication quality of the multi-streams on the basis of quality information of a received signal fed back from a reception device that has received the amplified multi-stream or quality information of a received signal calculated using at least characteristics of the plurality of amplification units.

Further, according to one aspect of the present invention, there is provided a transmission device that performs MIMO transmission, the transmission device including: a precoding unit configured to precode multi-streams of transmission signals in a time domain; a plurality of transmission power control units configured to control transmission power of each multi-stream precoded by the precoding unit; a plurality of amplification units configured to amplify each multi-stream precoded by the precoding unit in accordance with control of the plurality of transmission power control units; and a number-of-taps control unit configured to perform control to change the number of taps of the precoding unit to improve communication quality of the multi-streams on the basis of quality information of a received signal fed back from a reception device that has received the multi-stream amplified by each of the plurality of amplification units or quality information of a received signal calculated using at least characteristics of the plurality of amplification units.

Advantageous Effects of Invention

According to the present invention, it is possible to improve an SNR while suppressing inter-stream interference in MIMO transmission.

BRIEF DESCRIPTION OF DRAWINGS

FIG. 5 is a diagram illustrating trends in an SNR and inter-stream interference when a transmission device according to one embodiment controls the number of precoding taps.

DESCRIPTION OF EMBODIMENTS

Figure 1:
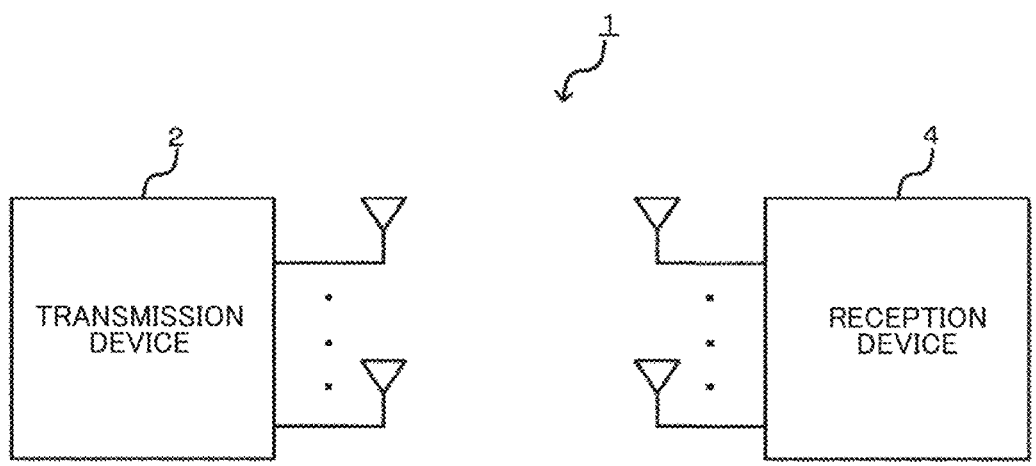
FIG. 1 is a diagram illustrating a configuration example of a radio communication system according to one embodiment.

An embodiment of a radio communication system will be described below with reference to the drawings. FIG. 1 is a diagram illustrating a configuration example of a radio communication system 1 according to one embodiment. As illustrated in FIG. 1, the radio communication system 1 is, for example, a MIMO system in which a transmission device 2 performs MIMO transmission to a reception device 4.

The transmission device 2 includes a plurality of antennas, precodes a multi-stream of a transmission signal in a time domain, and performs MIMO transmission to the reception device 4. The transmission device 2 transmits a training signal for calculating communication channel information (for example, channel state information: CSI) to the reception device 4.

The reception device 4 receives the multi-stream transmitted by the transmission device 2 and feeds quality information of the received signal back to the transmission device 2. The quality information of the received signal fed back to the transmission device 2 by the reception device 4 includes, for example, a channel quality indicator (CQI) and a precoding matrix indicator (PMI). The reception device 4 calculates communication channel information using the received training signal, and transmits the calculated communication channel information to the transmission device 2.

The communication channel information may be known or unknown to the transmission device 2. The transmission device 2 and the reception device 4 may have the same functions as each other to perform transmission and reception.

Figure 2:
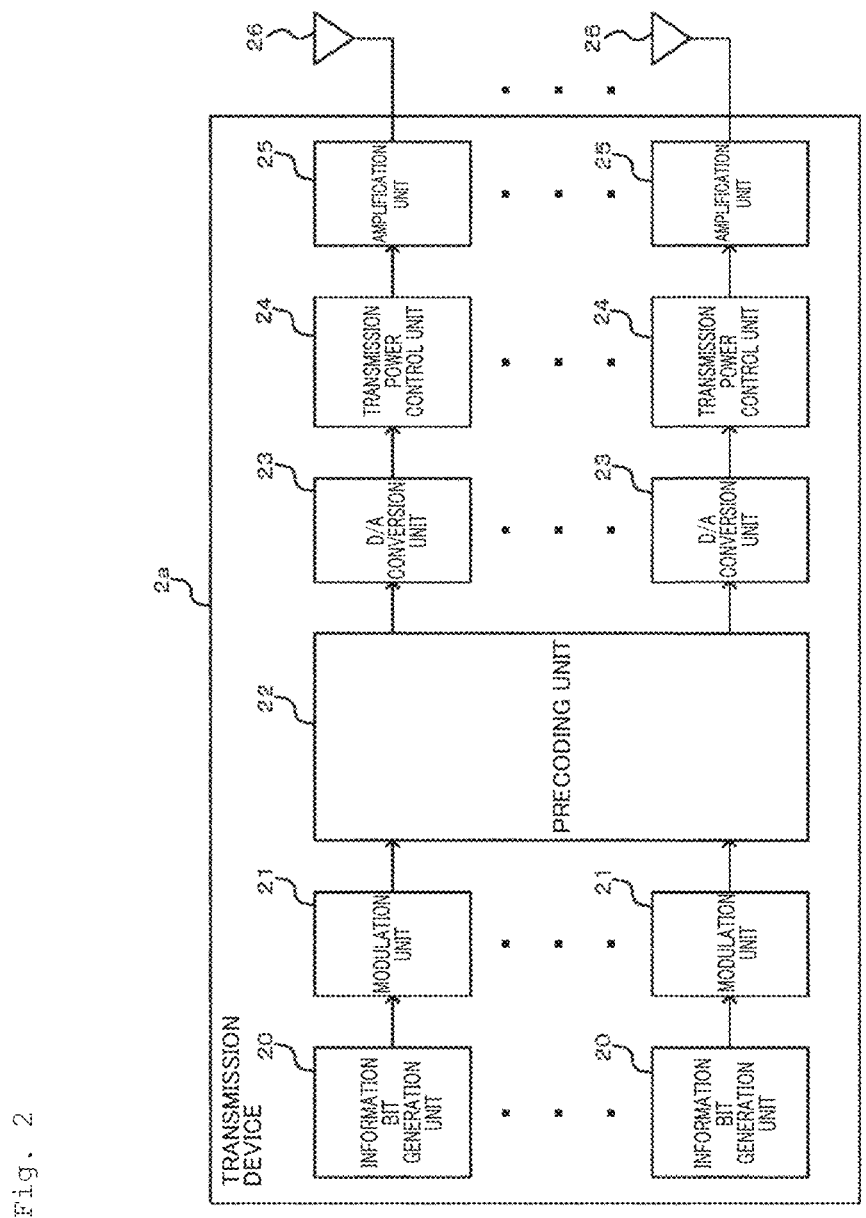
FIG. 2 is a functional block diagram illustrating functions of a transmission device of a comparative example.

Here, in order to help understand the configuration of the transmission device according to one embodiment, a configuration example of a transmission device 2a of a comparative example will be described. FIG. 2 is a functional block diagram illustrating functions of a transmission device 2a of a comparative example.

As illustrated in FIG. 2, the transmission device 2a of the comparative example includes a plurality of information bit generation units 20, a plurality of modulation units 21, a precoding unit 22, a plurality of D/A conversion units 23, a plurality of transmission power control units 24, a plurality of amplification units 25, and a plurality of antennas 26. The transmission device 2a can constitute the radio communication system 1 in place of the transmission device 2 illustrated in FIG. 1.

Each of the information bit generation units 20 generates an information bit (data signal) as a transmission signal, and outputs the information bit to the modulation unit 21. Each data signal generated by the information bit generation unit 20 becomes a stream.

Each of the modulation units 21 modulates the data signal input from the information bit generation unit 20 using a predetermined modulation scheme, and outputs the modulated data signal to the precoding unit 22. Modulation schemes include, for example, quadrature phase shift keying (QPSK) in which one symbol has four values, 16 quadrature amplitude modulation (QAM) in which one symbol has 16 values, and 64 QAM in which one symbol has 64 values.

The precoding unit 22 precodes multi-streams of data signals in the time domain and outputs each stream to the plurality of D/A conversion units 23. When the precoding unit 22 performs precoding, a PAPR increases.

Each of the D/A conversion units 23 D/A-converts the stream input from the precoding unit 22 and outputs the D/A-converted stream to the transmission power control unit 24.

Each of the transmission power control units 24 controls the transmission power of the stream input from the D/A conversion unit 23 and outputs the stream to the amplification unit 25.

That is, the plurality of transmission power control units 24 control transmission power of each multi-stream precoded by the precoding unit 22.

The plurality of amplification units 25 amplify each multi-stream precoded by the precoding unit 22 in accordance with the control of each of the transmission power control units 24, and radiate the amplified multi-streams via the antennas 26.

Figure 3:
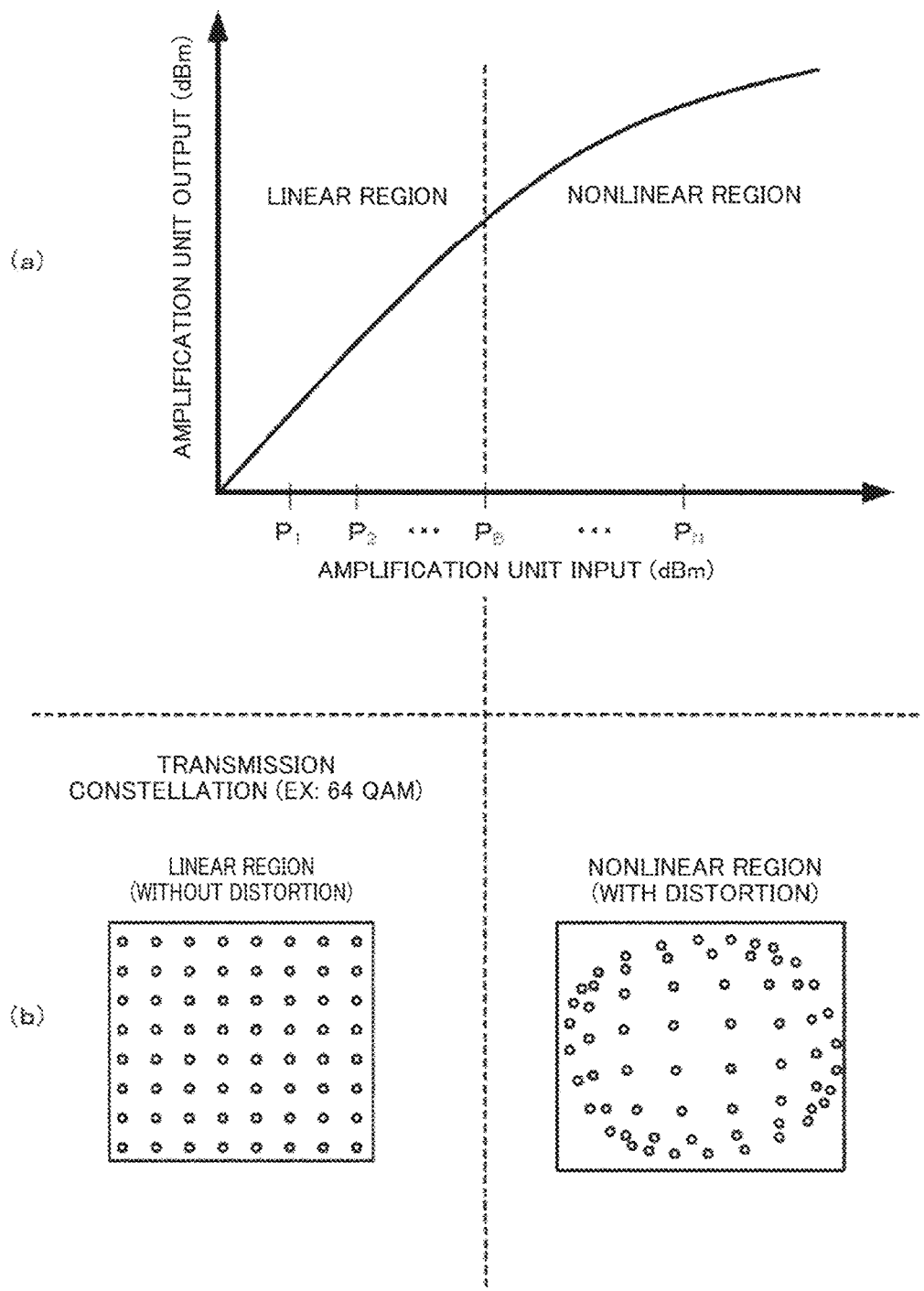
FIG. 3(a) is a graph illustrating amplification characteristics of an amplification unit.
FIG. 3(b) is a diagram illustrating a constellation of a transmission signal amplified by the amplification unit.

FIG. 3 is a diagram illustrating amplification characteristics of the amplification unit 25. FIG. 3(a) is a graph illustrating amplification characteristics of the amplification unit 25. FIG. 3(b) is a diagram illustrating a constellation of a transmission signal amplified by the amplification unit 25.

As illustrated in FIG. 3(a), the amplification unit 25 has a linear region for amplifying and outputting an input in proportion to the input, and a nonlinear region for nonlinearly amplifying an excessive input.

As illustrated in FIG. 3(b), distortion does not occur in the transmission constellation when the amplification unit 25 amplifies the data signal in the linear region, but distortion occurs in the transmission constellation when the amplification unit 25 amplifies the data signal in the nonlinear region. When distortion occurs in the transmission constellation, the streams are not orthogonal, and inter-stream interference occurs.

Figure 4:
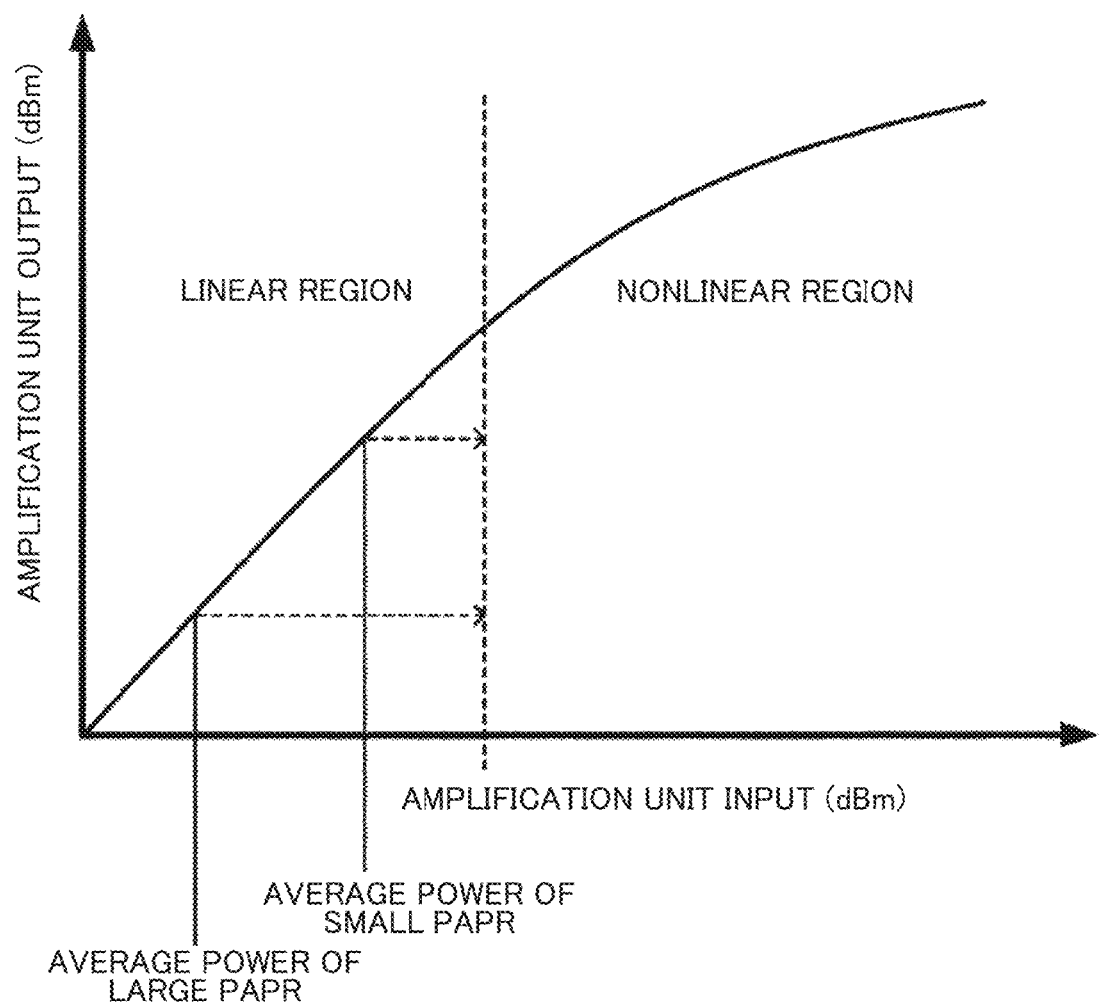
FIG. 4 is a graph illustrating a relationship between amplification characteristics of the amplification unit and a PAPR.

FIG. 4 is a graph illustrating a relationship between amplification characteristics of the amplification unit 25 and the PAPR. As illustrated in FIG. 4, the average power (transmission power) is suppressed when the PAPR is large, for example, compared to the average power (transmission power) when the PAPR is small. However, when the transmission power is suppressed, the SNR deteriorates (decreases) as described above.

In order to improve the SNR while suppressing inter-stream interference in such MIMO transmission, a transmission device according to one embodiment to be described later is configured to be able to control the number of precoding taps.

FIG. 5 is a diagram illustrating trends in an SNR and inter-stream interference when a transmission device according to one embodiment controls the number of precoding taps.

As illustrated in FIG. 5, when the transmission device according to one embodiment performs control to increase the number of precoding taps, the SNR deteriorates due to the effect of suppressing transmission power that increases the PAPR. On the other hand, inter-stream interference is suppressed because the number of taps is sufficient.

Further, when the transmission device according to one embodiment performs control to reduce the number of precoding taps, the SNR is improved by the effect of increasing the transmission power that reduces the PAPR. On the other hand, inter-stream interference increases because the number of taps is insufficient.

Figure 6:
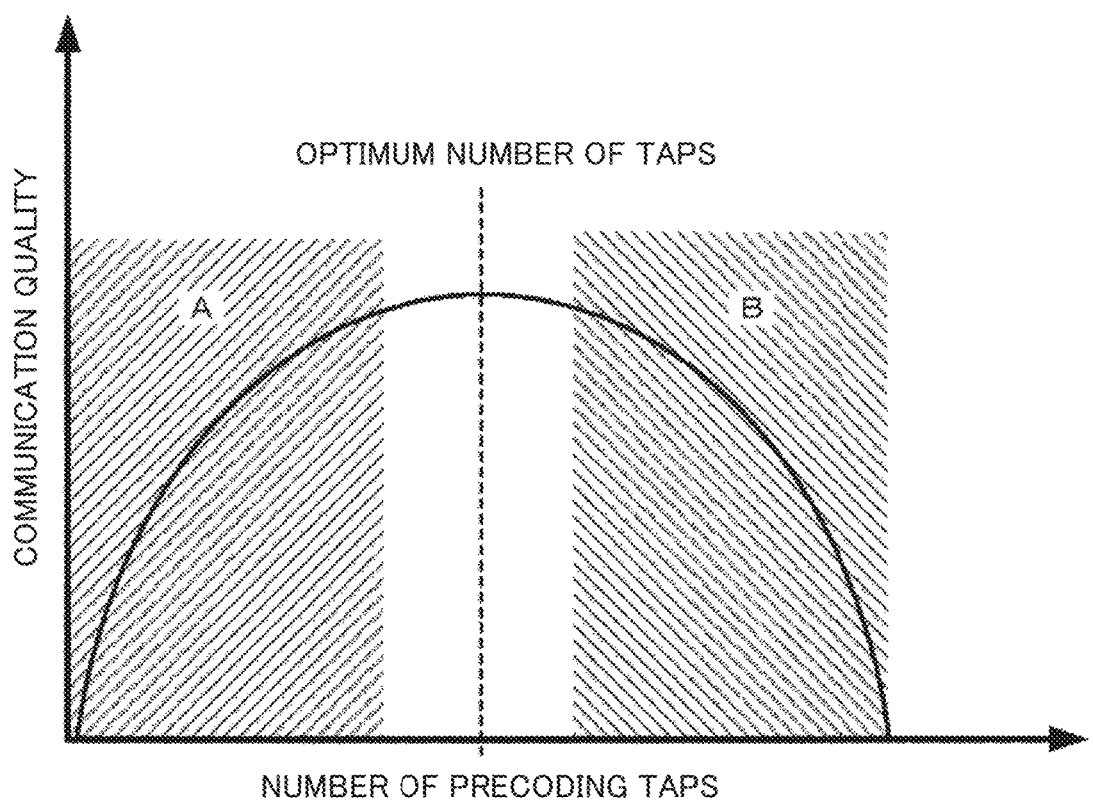
FIG. 6 is a graph conceptually illustrating functions and features of the transmission device according to one embodiment.

FIG. 6 is a graph conceptually illustrating functions and features of the transmission device according to one embodiment. Region A illustrated in FIG. 6 is a region in which inter-stream interference becomes dominant and the communication quality deteriorates because the number of precoding taps is small and insufficient. Region B is a region in which deterioration in the SNR becomes dominant and the communication quality deteriorates because the number of precoding taps is large and the PAPR is increased.

The transmission device according to one embodiment is configured to control the number of precoding taps so as not to be included in region A or region B illustrated in FIG. 6, and to perform MIMO transmission by setting the optimum number of precoding taps.

Figure 7:
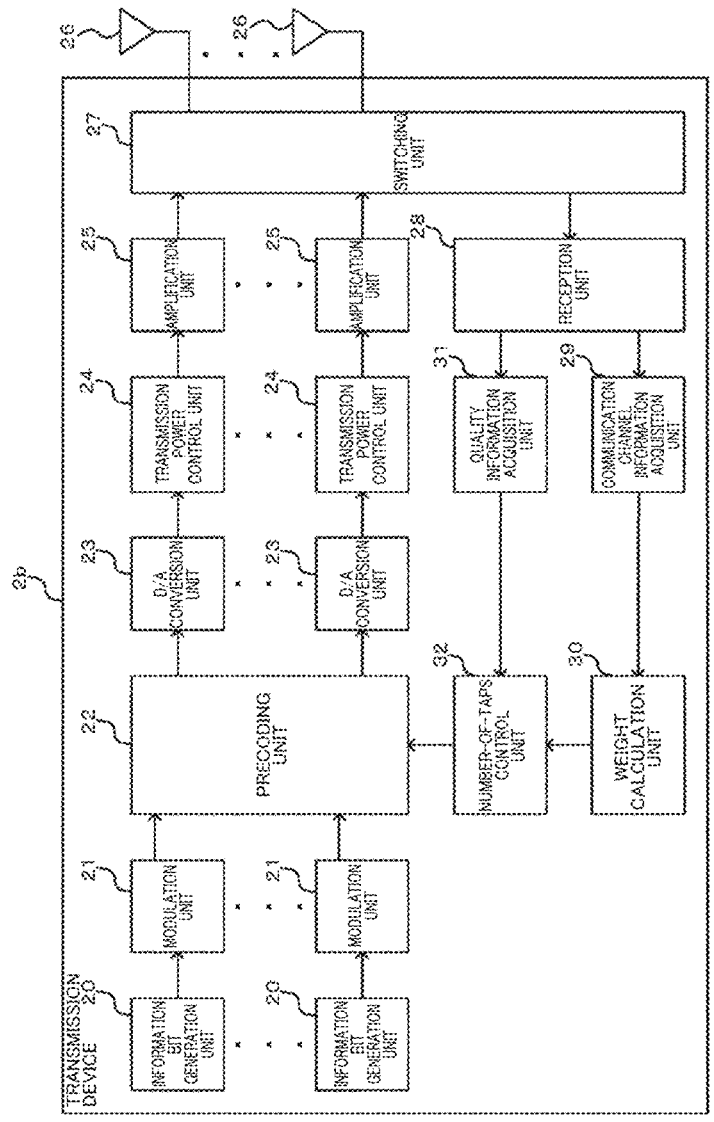
FIG. 7 is a functional block diagram illustrating functions of a transmission device according to one embodiment.

Next, a specific configuration example of a transmission device 2b according to one embodiment will be described. FIG. 7 is a functional block diagram illustrating functions of a transmission device 2b according to one embodiment.

As illustrated in FIG. 7, the transmission device 2b according to one embodiment includes a plurality of information bit generation units 20, a plurality of modulation units 21, a precoding unit 22, a plurality of D/A conversion units 23, a plurality of transmission power control units 24, a plurality of amplification units 25, a plurality of antennas 26, a switching unit 27, a reception unit 28, a communication channel information acquisition unit 29, a weight calculation unit 30, a quality information acquisition unit 31, and a number-of-taps control unit 32.

In the transmission device 2b illustrated in FIG. 7, the same reference numerals are given to substantially the same components as those of the transmission device 2a illustrated in FIG. 2. Also, the transmission device 2b can constitute the radio communication system 1 in place of the transmission device 2 illustrated in FIG. 1.

The switching unit 27 has a function of switching transmission and reception performed via the antenna 26, causes an output signal of the amplification unit 25 to be transmitted from the antenna 26, and outputs the signal received by the antenna 26 to the reception unit 28.

The reception unit 28 processes the signal received via the antenna 26 and outputs the processed signal to the communication channel information acquisition unit 29 or the quality information acquisition unit 31.

The communication channel information acquisition unit 29 acquires communication channel information from the signal processed by the reception unit 28, and outputs the communication channel information to the weight calculation unit 30.

The weight calculation unit 30 calculates a weight of precoding performed by the precoding unit 22 for each communication channel included in the communication channel information acquired by the communication channel information acquisition unit 29, and outputs the communication channel information and the weight to the number-of-taps control unit 32.

The quality information acquisition unit 31 acquires quality information from the signal processed by the reception unit 28, and outputs the quality information to the number-of-taps control unit 32. The quality information includes an SNR and a bit error rate (BER) acquired by the reception device 4 using a training signal (known signal) transmitted by the transmission device 2, and includes nonlinear distortion by the amplification unit 25 of the transmission device 2 and influence of inter-stream interference due to insufficient precoding.

The number-of-taps control unit 32 performs control to change the number of taps of the precoding unit 22 to improve communication quality of the multi-streams on the basis of quality information of the received signal fed back from the reception device 4 (see FIG. 1) that has received the multi-stream amplified by each of the plurality of amplification units 25.

Then, the number-of-taps control unit 32 performs control to change the number of taps of the precoding unit 22 to reduce inter-stream interference while increasing the SNR of the multi-stream.

Further, the number-of-taps control unit 32 may perform control to change the number of taps of the precoding unit 22 on the basis of at least one of a PAPR, a signal power to interference power ratio (SIR), and a BER of the multi-stream.

Figure 8:
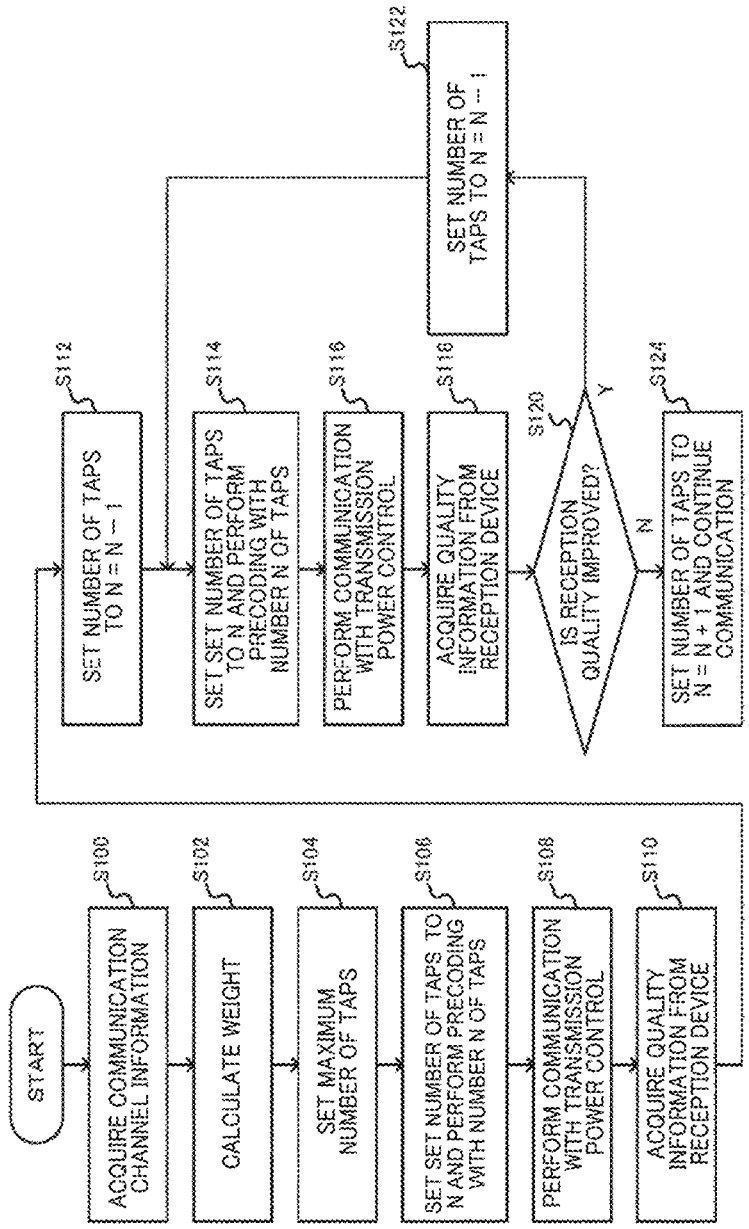
FIG. 8 is a flowchart illustrating an operation example of the transmission device according to one embodiment.

Next, an operation example of the transmission device 2b according to one embodiment will be described. FIG. 8 is a flowchart illustrating an operation example of the transmission device 2b according to one embodiment.

As illustrated in FIG. 8, in step 100 (S100), the transmission device 2b transmits a training signal to the reception device 4, and the communication channel information acquisition unit 29 acquires communication channel information from the reception device 4.

In step 102 (S102), the weight calculation unit 30 calculates a precoding weight.

In step 104 (S104), the number-of-taps control unit 32 sets the maximum number of taps based on the precoding weight in the precoding unit 22.

In step 106 (S106), the precoding unit 22 sets the set number of taps to N and performs precoding with the number N of taps.

In step 108 (S108), the transmission power control unit 24 performs transmission power control according to the PAPR. That is, the transmission device 2 transmits a signal to the reception device 4.

In step 110 (S110), the quality information acquisition unit 31 acquires quality information from the reception device 4.

In step 112 (S112), the number-of-taps control unit 32 sets the number of taps of the precoding unit 22 to N=N−1.

In step 114 (S114), the precoding unit 22 sets the set number of taps to N and performs precoding with the number N of taps.

In step 116 (S116), the transmission power control unit 24 performs transmission power control according to the PAPR. That is, the transmission device 2 transmits a signal to the reception device 4.

In step 118 (S118), the quality information acquisition unit 31 acquires quality information from the reception device 4.

In step 120 (S120), the number-of-taps control unit 32 determines whether or not the reception quality in the reception device 4 is improved on the basis of the quality information. When the number-of-taps control unit 32 determines that the reception quality is improved (S120: Yes), the process proceeds to S122, and when the number-of-taps control unit 32 determines that the reception quality is not improved (S120: No), the process proceeds to S124.

In step 122 (S122), the number-of-taps control unit 32 of the transmission device 2b sets the number of taps of the precoding unit 22 to N=N−1, and the process proceeds to S114.

In step 124 (S124), the number-of-taps control unit 32 of the transmission device 2b sets the number of taps of the precoding unit 22 to N=N+1 and continues communication with the reception device 4.

Figure 9:
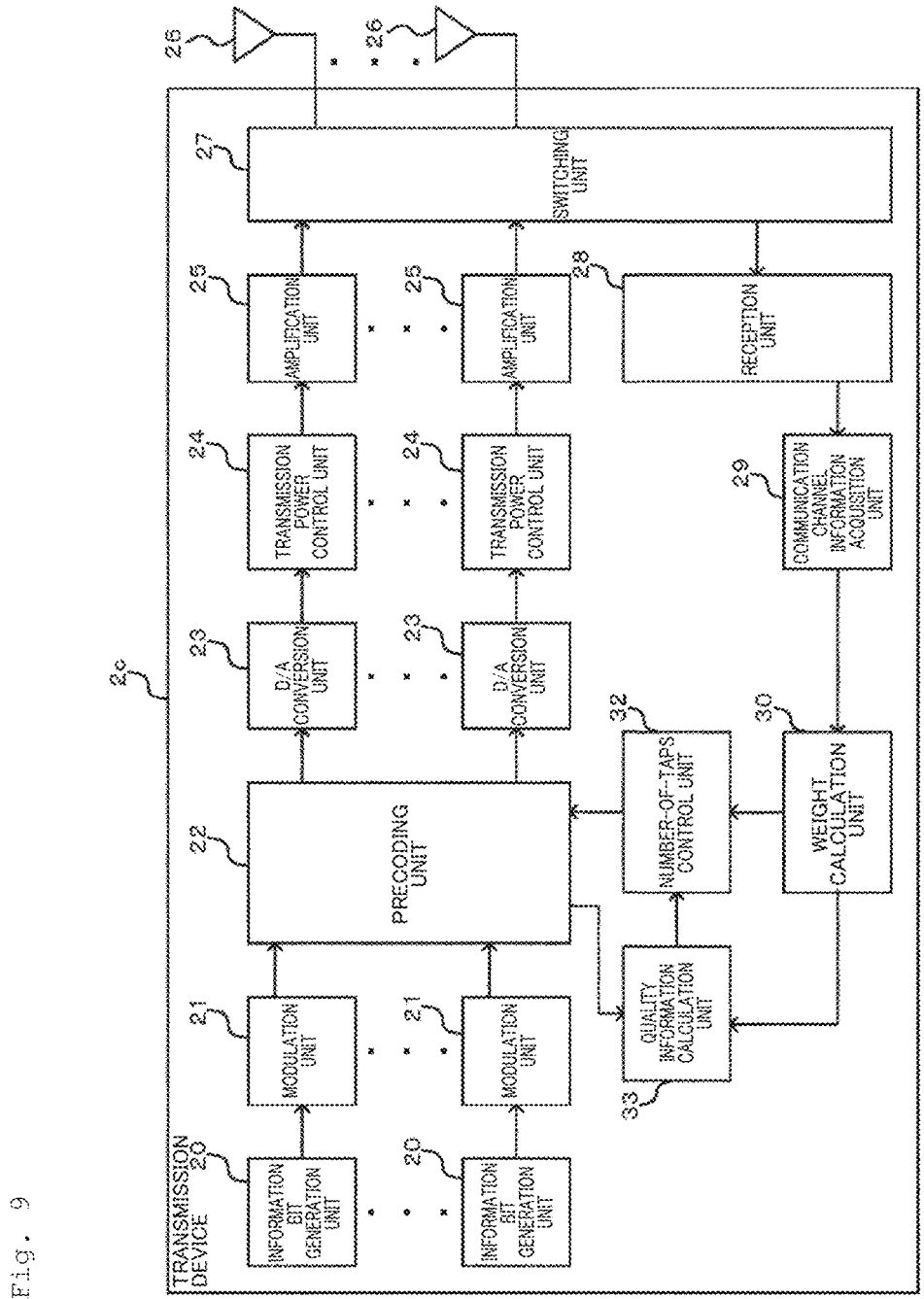
FIG. 9 is a functional block diagram illustrating functions of a modification example of the transmission device according to one embodiment.

Next, a modification example of the transmission device 2b according to one embodiment will be described. FIG. 9 is a functional block diagram illustrating functions of a modification example (transmission device 2c) of the transmission device 2b according to one embodiment.

As illustrated in FIG. 9, the transmission device 2c according to one embodiment includes a plurality of information bit generation units 20, a plurality of modulation units 21, a precoding unit 22, a plurality of D/A conversion units 23, a plurality of transmission power control units 24, a plurality of amplification units 25, a plurality of antennas 26, a switching unit 27, a reception unit 28, a communication channel information acquisition unit 29, a weight calculation unit 30, a number-of-taps control unit 32, and a quality information calculation unit 33.

In the transmission device 2c illustrated in FIG. 9, the same reference numerals are given to substantially the same components as those of the transmission device 2b illustrated in FIG. 7. Also, the transmission device 2c can constitute the radio communication system 1 in place of the transmission device 2 illustrated in FIG. 1. The transmission device 2c may be configured to have known communication channel information.

The quality information calculation unit 33 uses at least the characteristics of the plurality of amplification units 25 to calculate quality information that replaces the above-described quality information acquired by the quality information acquisition unit 31, and outputs the calculated quality information to the number-of-taps control unit 32. The quality information calculation unit 33 can estimate a BER due to nonlinear distortion when the characteristics of the amplification unit 25 are known. Also, the quality information calculation unit 33 may acquire the communication channel information and the precoding weight from the weight calculation unit 30.

Further, the quality information calculation unit 33 may compare the PAPR with the SIR to calculate the quality information. For example, the quality information calculation unit 33 uses the following formula when calculating the SIR of 3×3 MIMO.

Communication channel information is represented by the following Formula (1).

[Math. 1]

$$H(z) = \begin{bmatrix} H_{11}(z) & H_{12}(z) & H_{13}(z) \\ H_{21}(z) & H_{22}(z) & H_{23}(z) \\ H_{31}(z) & H_{32}(z) & H_{33}(z) \end{bmatrix} \quad (1)$$

where, $$H_{n_r,n_t}(z) = \sum_{l=0}^{L-1} h_{n_r,n_t}^{(l)} z^{-l}$$

$h_{n_r,n_t}^{(l)}$ : $l$−th pass CIR between the $n_r$− th receiving antenna and the $n_t$−th receiving antenna $z^{-1}$: delay operator of the transfer function A precoding weight is represented by the following Formula (2).

[Math. 2]

$$W(z) = \begin{bmatrix} W_{11}(z) & W_{12}(z) & W_{13}(z) \\ W_{21}(z) & W_{22}(z) & W_{23}(z) \\ W_{31}(z) & W_{32}(z) & W_{33}(z) \end{bmatrix} \quad (2)$$

where, $$W_{n_t,s_t}(z) = \sum_{n=0}^{N-1} w_{n_r,n_t}^{(n)} z^{-n}$$

$w_{n_t,s_t}^{(n)}$: $n$−th tap coefficient of the filter between the $n_t$−th transmitting antenna and $s_t$−th stream Then, the quality information calculation unit 33 calculates the SIR of each stream as shown by the following Formulas (4) to (6) by using the diagonal component and the non-diagonal component of the following Formula (3). Note that the quality information calculation unit 33 may be configured to use the average value of the SIR of each stream.

[Math. 3]

$$W(z)H(z) = \begin{bmatrix} A_{11}(z) & \Delta_{12}(z) & \Delta_{13}(z) \\ \Delta_{21}(z) & A_{22}(z) & \Delta_{23}(z) \\ \Delta_{31}(z) & \Delta_{32}(z) & A_{33}(z) \end{bmatrix} \quad (3)$$

where, $$A_{i,j}(z) = \sum_{k=0}^{K-1} a_{i,j}^{(k)} z^{-k}$$

$$\Delta_{i,j}(z) = \sum_{k=0}^{K-1} \delta_{i,j}^{(k)} z^{-k}$$

[Math. 4]

$$SIR_1 = \frac{\sum_{k=0}^{K-1} |a_{11}^{(k)}|^2}{\sum_{k=0}^{K-1} |\delta_{12}^{(k)}|^2 + \sum_{k=0}^{K-1} |\delta_{13}^{(k)}|^2} \quad (4)$$

[Math. 5]

$$SIR_2 = \frac{\sum_{k=0}^{K-1} |a_{22}^{(k)}|^2}{\sum_{k=0}^{K-1} |\delta_{21}^{(k)}|^2 + \sum_{k=0}^{K-1} |\delta_{23}^{(k)}|^2} \quad (5)$$

[Math. 6]

$$SIR_3 = \frac{\sum_{k=0}^{K-1} |a_{33}^{(k)}|^2}{\sum_{k=0}^{K-1} |\delta_{31}^{(k)}|^2 + \sum_{k=0}^{K-1} |\delta_{32}^{(k)}|^2} \quad (6)$$

Then, the number-of-taps control unit 32 performs control to change the number of taps of the precoding unit 22 to improve the communication quality of the multi-stream on the basis of the quality information of the received signal calculated by the quality information calculation unit 33.

For example, the number-of-taps control unit 32 performs control to optimize the number of taps in accordance with system requirements (characteristics of the amplification unit 25 and desired BER characteristics, etc.). In this case, since the transmission device 2c does not need to receive the quality information from the reception device 4, the reception device 4 may not have the function of feeding the quality information back to the transmission device 2c.

In this way, in the transmission device 2b or the transmission device 2c, the number of taps of the precoding unit 22 is changed to improve communication quality of the multi-streams on the basis of quality information of a received signal fed back from the reception device 4 that has received the multi-stream amplified by each of the plurality of amplification units 25 or quality information of a received signal calculated using at least characteristics of the plurality of amplification units 25. Accordingly, it is possible to improve an SNR while suppressing inter-stream interference in MIMO transmission.

Note that, each unit constituting the transmission device 2b and the transmission device 2c in the above-described embodiment may be configured partially or wholly by hardware, or may be configured by causing a processor to execute a program.

In addition, when each unit constituting the transmission device 2b and transmission device 2c is partially or wholly configured by causing a processor to execute a program, the program may be recorded on a recording medium and provided, or may be provided via a network.

REFERENCE SIGNS LIST

1 Radio communication system
2, 2a, 2b, 2c Transmission device
4 Reception device
20 Information bit generation unit
21 Modulation unit
22 Precoding unit
23 D/A conversion unit
24 Transmission power control unit
25 Amplification unit
26 Antenna
27 Switching unit
28 Reception unit
29 Communication channel information acquisition unit
30 Weight calculation unit
31 Quality information acquisition unit
32 Number-of-taps control unit
33 Quality information calculation unit

The invention claimed is:

1. A radio communication system that performs MIMO transmission, the radio communication system comprising:
    precoding circuitry configured to precode multi-streams of transmission signals in a time domain;
    a plurality of transmission power control circuitry configured to control transmission power of each multi-stream precoded by the precoding circuitry;
    a plurality of amplification circuitry configured to amplify each multi-stream precoded by the precoding circuitry in accordance with control of the plurality of transmission power control circuitry; and
    a number-of-taps control circuitry configured to perform control to change a number of taps of the precoding circuitry to improve communication quality of the multi-streams on a basis of quality information of a received signal fed back from a reception device that has received the multi-stream amplified by each of the plurality of amplification circuitry or quality information of a received signal calculated using at least characteristics of the plurality of amplification circuitry.

2. The radio communication system according to claim 1, wherein:
    the number-of-taps control circuitry performs control to change the number of taps of the precoding circuitry to reduce inter-stream interference while increasing an SNR of the multi-streams.

3. The radio communication system according to claim 1, wherein:
    the number-of-taps control circuitry performs control to change the number of taps of the precoding circuitry on the basis of at least one of a peak to average power ratio, a signal power to interference power ratio, and a bit error rate of the multi-streams.

4. A radio communication method for performing MIMO transmission, the radio communication method comprising:
    precoding multi-streams of transmission signals in a time domain;
    controlling transmission power of each precoded multi-stream; and
    amplifying each precoded multi-stream by a plurality of amplification circuitry to achieve controlled transmission power,
    wherein the radio communication method further comprises performing control to change a number of precoding taps to improve communication quality of the multi-streams on a basis of quality information of a received signal fed back from a reception device that has received the amplified multi-stream or quality information of a received signal calculated using at least characteristics of the plurality of amplification circuitry.

5. The radio communication method according to claim 4, wherein:
    the performing control to change the number of precoding taps to reduce inter-stream interference while increasing an SNR of the multi-streams.

6. A transmission device that performs MIMO transmission, the transmission device comprising:
    precoding circuitry configured to precode multi-streams of transmission signals in a time domain;
    a plurality of transmission power control circuitry configured to control transmission power of each multi-stream precoded by the precoding circuitry;
    a plurality of amplification circuitry configured to amplify each multi-stream precoded by the precoding circuitry in accordance with control of the plurality of transmission power control circuitry; and
    a number-of-taps control circuitry configured to perform control to change a number of taps of the precoding circuitry to improve communication quality of the multi-streams on a basis of quality information of a received signal fed back from a reception device that has received the multi-stream amplified by each of the plurality of amplification circuitry or quality information of a received signal calculated using at least characteristics of the plurality of amplification circuitry.

7. The transmission device according to claim 6, wherein:
the number-of-taps control circuitry performs control to change the number of taps of the precoding circuitry to reduce inter-stream interference while increasing an SNR of the multi-streams.

8. The transmission device according to claim 6, wherein:
the number-of-taps control circuitry performs control to change the number of taps of the precoding circuitry on the basis of at least one of a peak to average power ratio, a signal power to interference power ratio, and a bit error rate of the multi-streams.

* * * * *